United States Patent
Krogh

(10) Patent No.: US 7,261,630 B2
(45) Date of Patent: Aug. 28, 2007

(54) CUTTING APPARATUS WITH DISPLACEMENT ELEMENT

(75) Inventor: Knud Krogh, Abybro (DK)

(73) Assignee: SKF Systems A/S, Kolding (DK)

( * ) Notice: Subject to any disclaimer, the term of this patent is extended or adjusted under 35 U.S.C. 154(b) by 16 days.

(21) Appl. No.: 10/433,073

(22) PCT Filed: Dec. 6, 2001

(86) PCT No.: PCT/DK01/00808

§ 371 (c)(1),
(2), (4) Date: Jul. 24, 2003

(87) PCT Pub. No.: WO02/051252

PCT Pub. Date: Jul. 4, 2002

(65) Prior Publication Data

US 2004/0063393 A1    Apr. 1, 2004

(30) Foreign Application Priority Data

Dec. 8, 2000    (DK) ............................... 2000 01845

(51) Int. Cl.
*A22B 5/20* (2006.01)
*A22C 17/02* (2006.01)
(52) U.S. Cl. ...................... 452/160; 452/152
(58) Field of Classification Search .............. 452/106, 452/107, 116, 117, 119, 120, 152, 160
See application file for complete search history.

(56) References Cited

U.S. PATENT DOCUMENTS

| | | | | |
|---|---|---|---|---|
| 637,490 A | * | 11/1899 | Tower et al. | 452/160 |
| 1,699,695 A | * | 1/1929 | Feister | 452/160 |
| 2,237,203 A | * | 4/1941 | Swanson | 452/106 |
| 3,402,426 A | * | 9/1968 | Svend | 452/160 |
| 3,533,131 A | * | 10/1970 | Bernhard | 452/160 |
| 3,829,932 A | * | 8/1974 | Griss | 452/160 |
| 4,087,886 A | * | 5/1978 | Aubert | 452/106 |
| 4,507,822 A | * | 4/1985 | Herubel | 452/160 |
| 4,653,150 A | * | 3/1987 | Leining | 452/160 |
| 4,841,602 A | * | 6/1989 | van der Hoorn et al. | 452/160 |
| 5,120,266 A | * | 6/1992 | Aubert | 452/120 |
| 5,160,295 A | | 11/1992 | Bekkers | |
| 5,326,309 A | * | 7/1994 | Buhot et al. | 452/106 |
| 5,613,905 A | * | 3/1997 | Van Ochten et al. | 452/160 |

(Continued)

FOREIGN PATENT DOCUMENTS

DE    2421225    * 11/1975

(Continued)

*Primary Examiner*—David Parsley
(74) *Attorney, Agent, or Firm*—William J. Sapone; Coleman Sudol Sapone P.C.

(57) ABSTRACT

An apparatus (1) for cutting up the belly of a slaughtered animal has a cutter for performing a cutting function in a cutting direction ($S_R$), and a displacement element (5) which applies a forces on a predetermined area of the outer surface of the belly of the animal and at a distance from the cutter. The apparatus (1) further has a suspension element (40) to which the displacement element (5) is pivotally attached around an axis of rotation (28). The axis of rotation (28) forms an obtuse or an acute angle with the cutting direction ($S_R$), so that rotation of the displacement member, oriented by the inclined axis of rotation, displaces the animal skin laterally away from the cutter.

8 Claims, 6 Drawing Sheets

Figure 2:
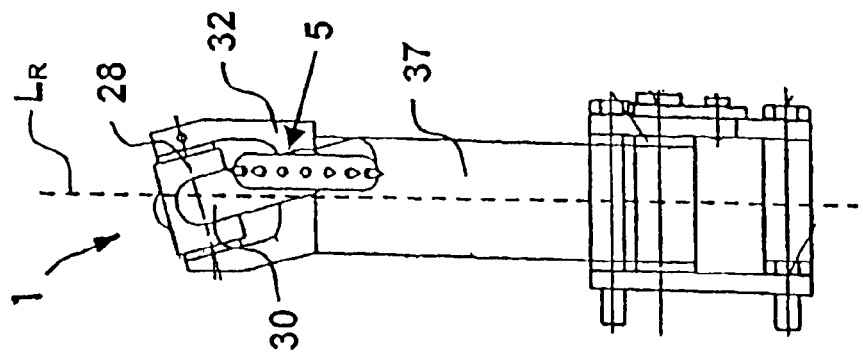

U.S. PATENT DOCUMENTS 5,655,960 A * 8/1997 Van Horeebeck ........... 452/160
5,779,533 A * 7/1998 Jacobs et al. ............... 452/160
6,050,889 A * 4/2000 Jacobs et al. ............... 452/160

FOREIGN PATENT DOCUMENTS

| | | | |
|---|---|---|---|
| DK | 164383 | 6/1992 | |
| EP | 0258939 | * | 3/1988 |
| EP | 0 743 006 | | 11/1996 |
| FR | 2788937 | * | 8/2000 |
| WO | WO93 01725 | | 2/1993 |
| WO | WO 00 18244 | | 4/2000 |

* cited by examiner

CUTTING APPARATUS WITH DISPLACEMENT ELEMENT

The invention concerns an apparatus for the cutting-up of the belly of slaughtered animals, comprising a first means for providing a cutting function in a cutting direction, and a displacement element, said displacement element creating a force on a predetermined area on the outer surface of the belly of the animal during the cutting process and at a distance from the first means, said apparatus further comprising a suspension system to which the displacement element is pivotally attached around an axis of rotation. The invention also concerns a method during use of the apparatus for the cutting of the belly of a slaughtered animal with a first means, and the use of such an apparatus and method.

In connection with the slaughtering of animals, especially pigs, it is desirable that the cutting and the parting takes place in a manner which is automated to the greatest possible degree. Today, the known stations and means of handling involve that after various preparations, including that the areas around the head and rectum receive an initial processing, a subsequent cutting-up of the belly of the animal is effected. This cutting has hitherto been possible only in a semi-automated manner, the reason being that the belly comprises areas which can contaminate the meat if the cutting is carried out incorrectly. During the cutting-up of male pigs, there must thus not take place any cutting-through of the penis, in that this will give rise to contamination of the meat due to the high bacteriological content in the penis. Today, therefore, the cutting-up of the belly area is effected in a mainly manual manner, so that the penis area is not damaged, and thus contamination is avoided. Such a process is naturally time consuming and therefore gives rise to the use of many man-hours.

From WO 93/01725, U.S. Pat. No. 5,160,295 and U.S. Pat. No. 637490, process methods are known for the cutting-up of the belly of slaughtered animals. The methods do not disclose how the cutting-up around the penis is possible, and thus do not solve the above-mentioned problem.

From EP-A-743006, an apparatus is known for displacement of e.g. the penis, and which works by the establishing of a vacuum in an area of the pig's belly and in this manner effects a displacement. Firstly, this displacement element does not constitute an integral part of the cutting apparatus, and secondly it will give rise to an interruption of the cutting process, the reason being that if the suction cup is to have the said effect it requires a certain period of time to function, which means that the cutting takes place in an abrupt and discontinuous manner. Moreover, since the displacement element does not constitute an integral part of the cutting arrangement, a setting is required for each individual pig in order that the displacement can take place in the right place.

From DK-B-164383, there is also known an apparatus for displacement of the penis which functions during the cutting process. This displacement comprises a rotating cone with a direction of rotation which firstly is at right angles to the cutting direction, and secondly gives rise to a slight contact by the cone, and where a displacement of the penis is effected by the rotation of the cone pulling the skin away. Since the apex of the cone is also directed in the cutting direction, there is a risk that this will bore down in the pig's belly during the cutting process. Moreover, there is a risk that the desired displacement of the penis is not effected. Finally, this will also give rise to a certain discontinuity in the cutting process as a consequence of the displacement not being effected in a gliding movement together with the cutting, but being effected as an abrupt movement at the moment that the cutting arrangement is required to pass the penis area.

In connection with the slaughtering of e.g. pigs, it is desirable that the cutting-up and parting takes place as automated and as contamination-free as at all possible. With the cutting of the pig in the belly area, it is important that the penis is not cut through during the cutting. Such a function is provided, for example, from WO 00/18244.

It has proved, however, that the function of this apparatus is optimised by effecting a change of the axis of rotation for the displacement element, so that when the displacement element is brought against the belly during the actual cutting of the pig in the area of the penis, this displacement element will bring about a displacement of the skin which transfers this displacement force to the surrounding skin, which in turn transfers the displacement force to the penis area which is thus drawn away from the area of engagement of the knife. The knife can be either a cantilever-knife or it can be configured as a circular saw.

According to the present invention, this desired displacement of the penis area is achieved by the axis of rotation providing an obtuse or acute angle with the cutting direction, and by the axis of rotation forming the fulcrum for the rotation of the displacement element.

At the moment that the axis for the rotation of the displacement element is movable in an angular manner, and where the axis of rotation forms an obtuse or acute angle with the cutting direction and/or cutting direction of the knife brought about during the cutting process, the displacement element forces the skin laterally away from the cutting direction, while at the same time the effect of the rotation around the axis is that the cutting process is not impeded, in that the displacement element, in a rolling movement and at the same time with the force exerted on the skin, follows the movement of the cutting element upwards and with the line of engagement/contact axially parallel with the cutting direction, whereby a more optimal displacement of the skin takes place.

The whole process is effected continuously, so that the displacement element shoots forward at the same time that the cutting continues, and where the turning of the displacement element ensures that there is no counteraction against the cutting movement. The displacement element is provided with friction-seeking means which provide a good grip on the skin and herewith a positive displacement of the penis area. The cutting process preferably takes place in a upwards continuous movement, without the force on the belly hindering the movement.

When the knife has passed the penis area, the displacement element will return to its start position, whereby there is no longer any force applied to the skin itself, and the skin will thus fall back to its normal position. The knife continues in its further forward movement. In this way, a fully-automatic, continuous and contamination-free cutting-up of the belly is achieved.

By providing an apparatus for the cutting-up of slaughtered animals according to the present invention, and as further disclosed in claim 2, it is achieved that the skin and herewith the penis is drawn away from the cutting direction of the knife, and at the same time that the cutting takes place in a continuous manner. The angle between the axis of rotation of the displacement element and the cutting direction of the knife results in a very effective lateral movement of the skin and herewith the penis.

By providing an apparatus for the cutting-up of slaughtered animals according to the present invention and as further disclosed in claim 3, an optimising of the lateral displacement is achieved.

By providing an apparatus for the cutting-up of slaughtered animals according to the present invention and as further disclosed in claim 4, it is achieved that the displacement element obtains a good grip on the skin of the slaughtered animal, and that the displacement element does not slide when the pressure is increased. Furthermore, it is achieved that the displacement element can be produced in different lengths, so that the displacement element can be adjusted for different types of abattoir equipment and different slaughtered animals.

By providing an apparatus for the cutting-up of slaughtered animals according to the present invention and as further disclosed in claim 5, a varying pressure is achieved which can be concentrated at the penis, said varying pressure being created due to the smaller radius of the curvature across the outermost points on the tips of the spikes in relation to the radius of the displacement element.

By providing an apparatus for the cutting-up of slaughtered animals according to the present invention and as further disclosed in claim 6, a system is achieved whereby the displacement element can be moved forwards and backwards so that the displacement element can apply a pressure on the slaughtered animal at the desired place in the cutting-up, and that the pressure can subsequently be removed.

By providing an apparatus for the cutting-up of slaughtered animals according to the present invention and as further disclosed in claim 7, it is achieved that the lower knife has two functions. The first function is that of a cutting function in co-operation with the upper knife, and the second function is that of a counter-stop against the pressure effect from the displacement element. There is thus brought about a displacement of the skin and the penis area without the slaughtered animal being turned around. The displacement element thus becomes an integral part of the first means/cutting arrangement, in that two functions co-operate in one and the same part.

By providing an apparatus for the cutting-up of slaughtered animals according to the present invention and as further disclosed in claim 8 and 9, two different configurations of the present invention can be achieved. The part-wheel segment is preferred in order to avoid a very complicated construction of the apparatus. Moreover, further configurations can be provided which will also be covered by the present invention.

By providing an apparatus for the cutting-up of slaughtered animals according to the present invention and as further disclosed in claim 10, a method is provided during the use of the apparatus according to the present invention whereby an optimal cutting-up of the belly of slaughtered animals is achieved.

Claim 11 discloses a further expedient process step in connection with the method disclosed in claim 10. By using the further process step, an effective cutting-over of the breastbone is achieved.

The invention also concerns a use of the method and apparatus such as this is disclosed in claim 12.

Figure 1:
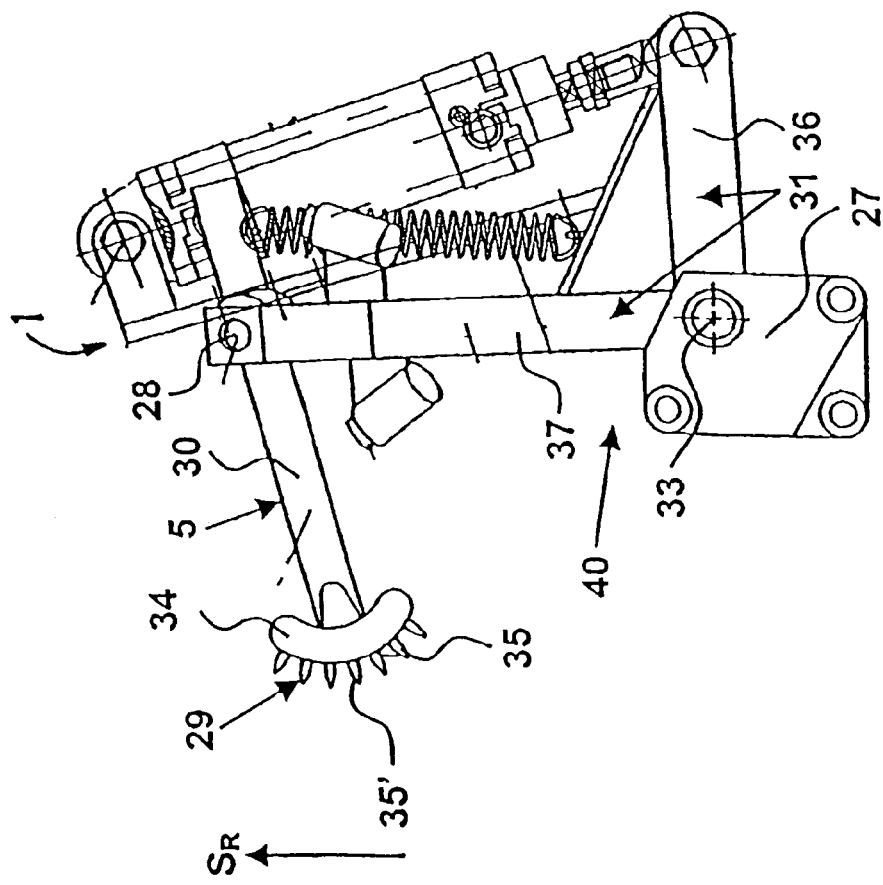
Figures 3, 4:
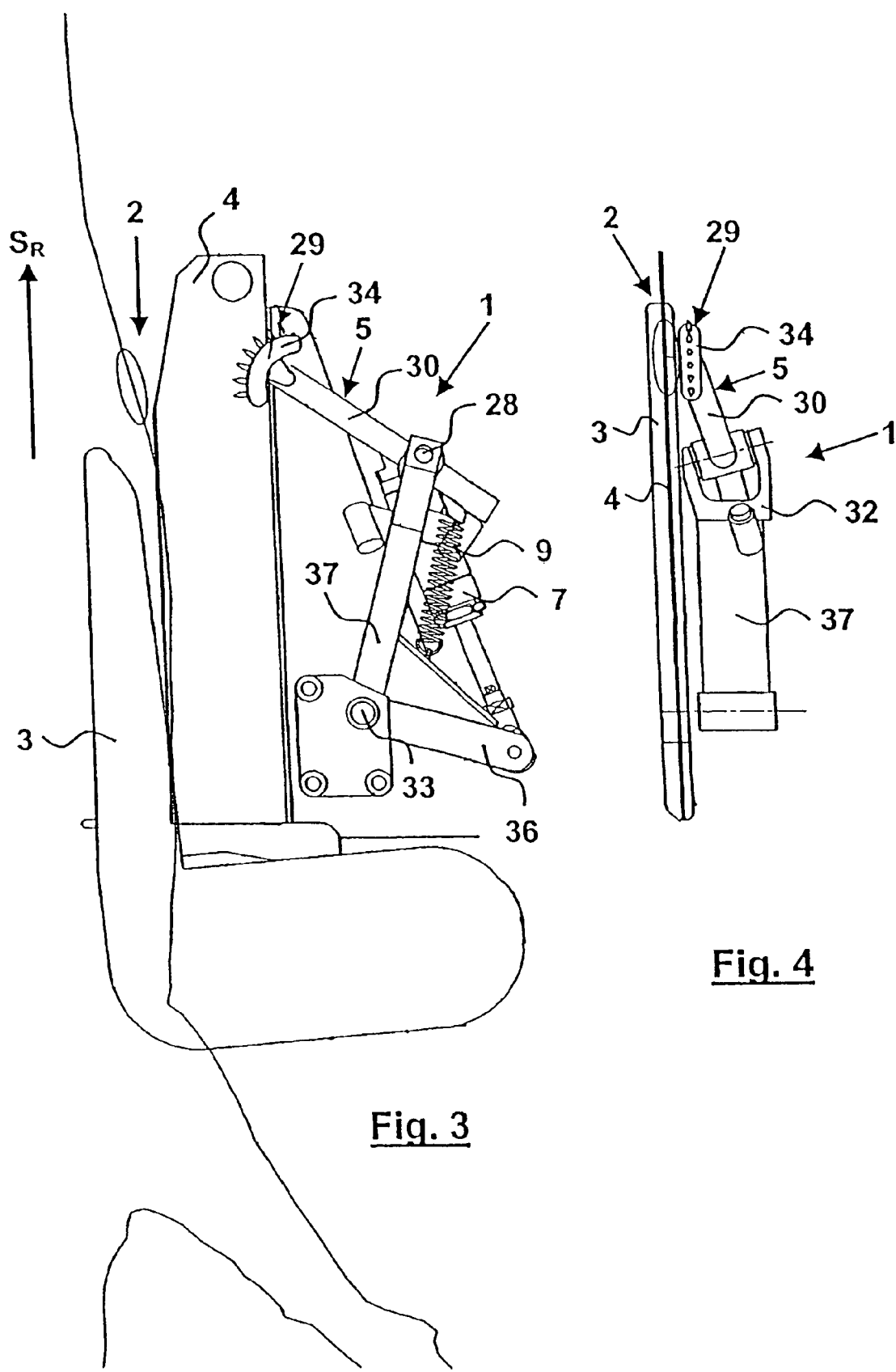
Figure 5:
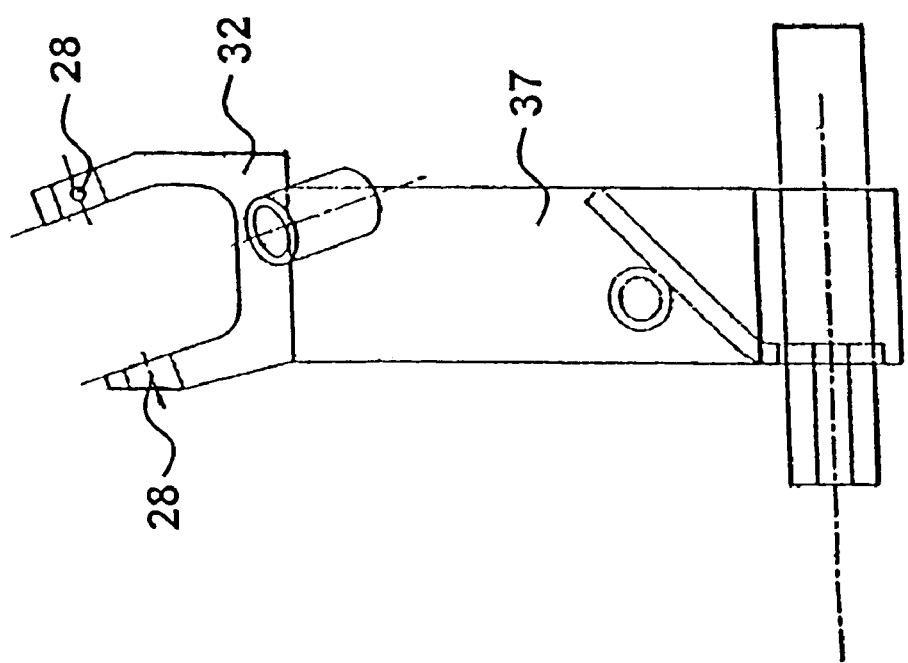
Figure 6:
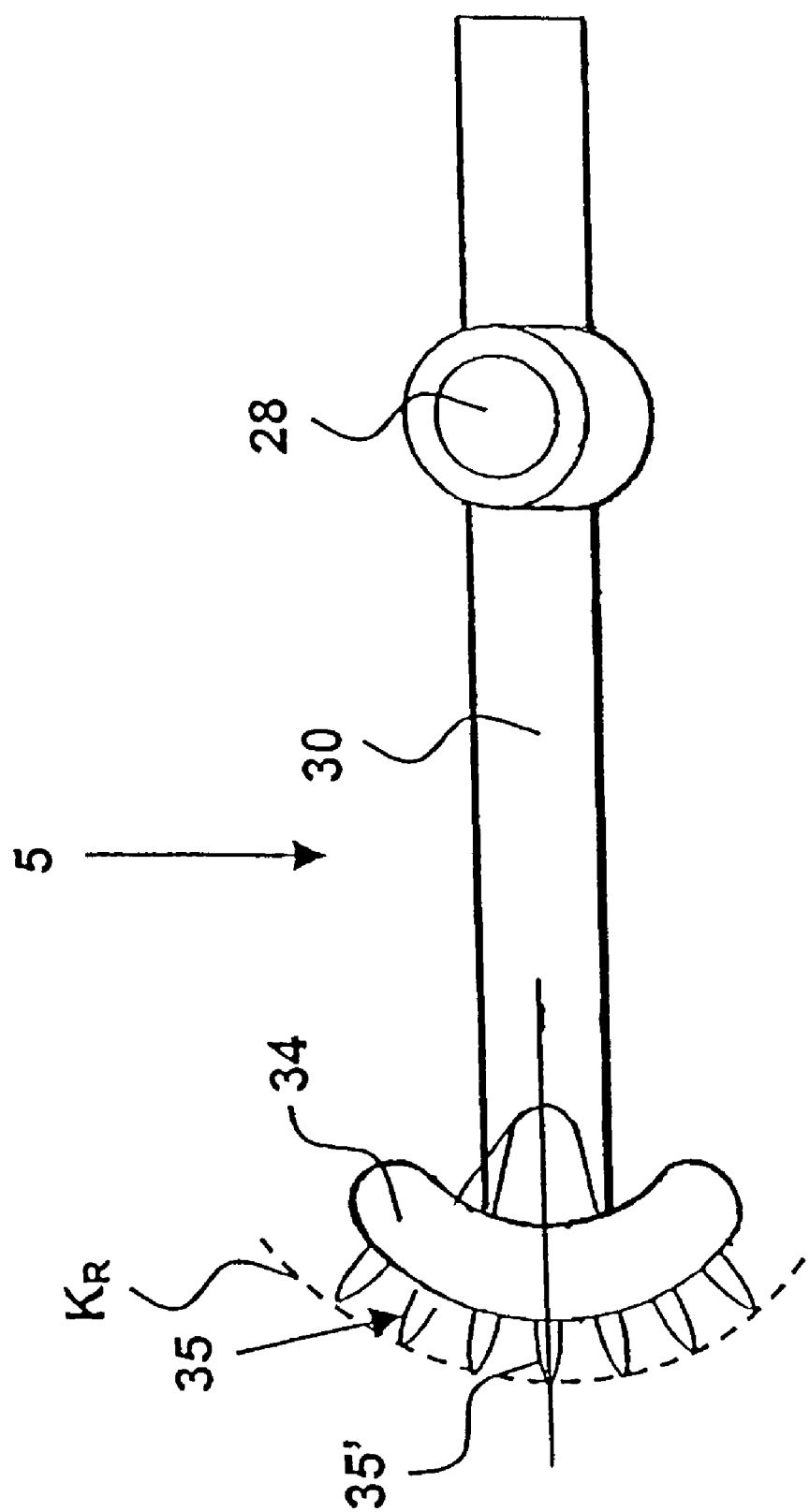
Figure 7D:
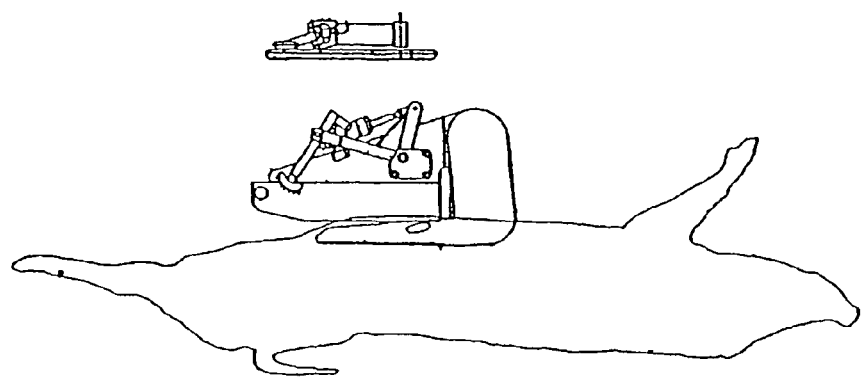
Figure 7C:
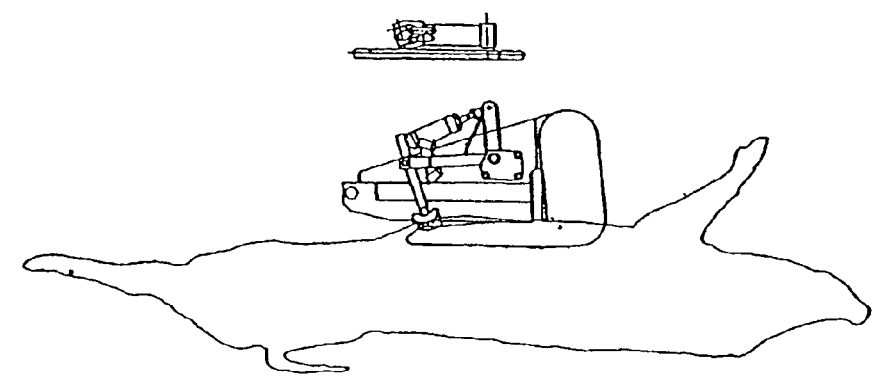
Figure 7B:
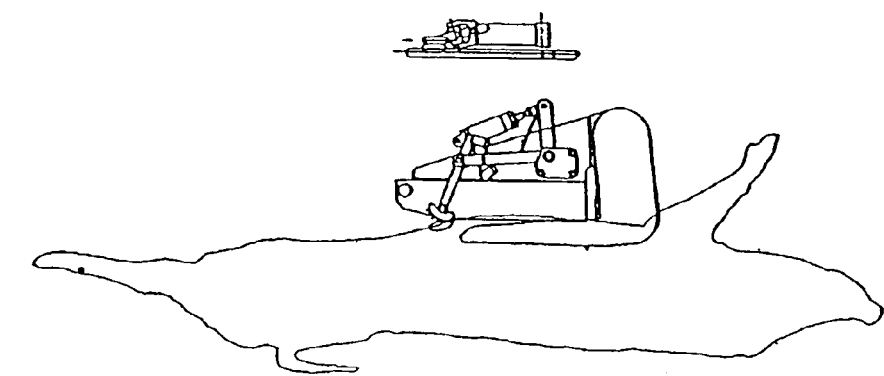
Figure 7A:
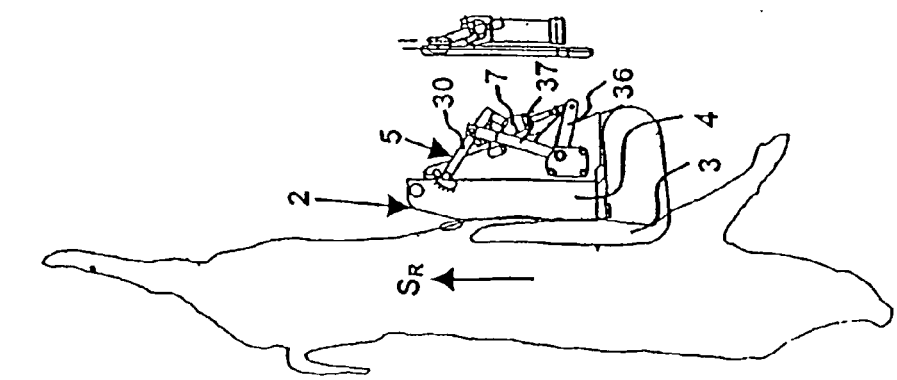
Figure 8C:
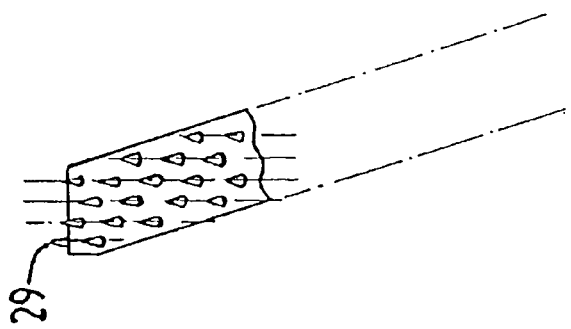
Figure 8B:
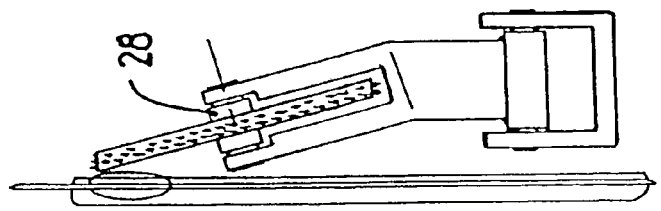
Figure 8A:
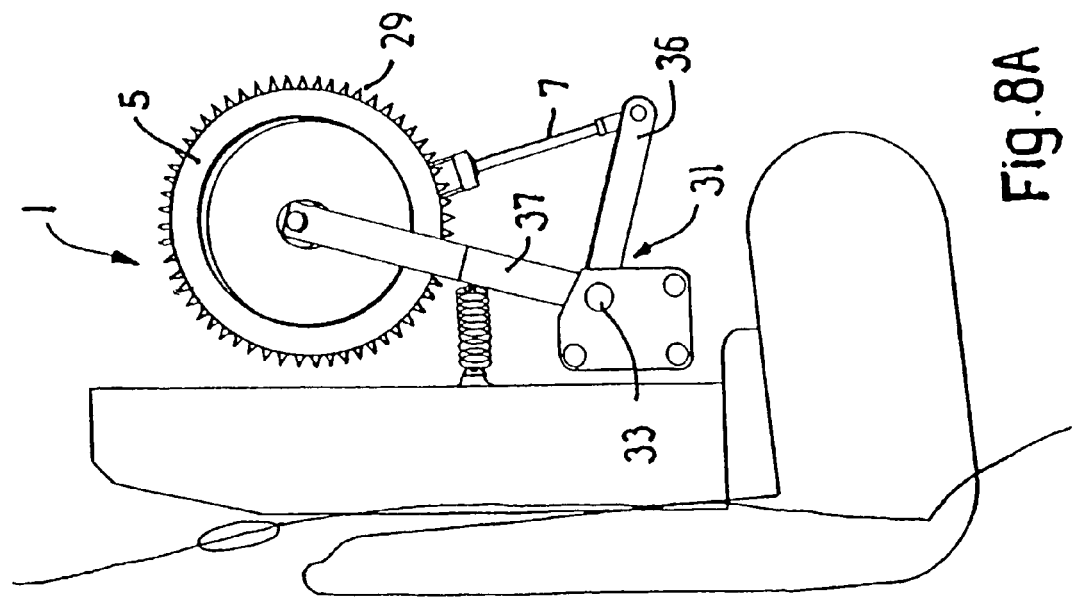

The invention will now be explained in more detail with reference to the drawing, where FIG. 1 shows the apparatus according to the invention seen from the side and before this is mounted on the knife, FIG. 2 shows the same as in FIG. 1 but seen from the front, FIG. 3 shows the apparatus seen from the side and mounted on a knife, FIG. 4 shows the relationships between the cutting surface of the knife and the engagement for the displacement element, FIG. 5 shows the yoke in which the axis of rotation for the displacement element is mounted, FIG. 6 shows a close-up view of the displacement element itself, FIG. 7a–d show different views of the cutting process during activation of both knife and displacement element, and FIG. 8a–c show an example embodiment where the displacement element is configured as a wheel.

FIG. 1 shows the apparatus 1 which comprises a suspension element 40, said suspension element 40 comprising a mounting plate 27 to which a frame 31 is secured. The frame 31 consists of a first profile 36 and a second profile 37 which are mounted on the plate 27 in a pivotal connection 33. The two profiles 36, 37 form an angle of substantially 90°, and this mutual relationship is maintained during the movements of the apparatus 1.

A displacement element 5 is mounted at the end of the second profile 37. The displacement element 5 is mounted at right-angles on an axis of rotation 28 on the free end of the second profile 37, and said axis of rotation 28 is angled 65–85° in relation to the cutting direction $S_R$. The displacement element 5 can, for example, be configured as a wheel with friction-seeking means 29 in its periphery, cf. FIG. 8, or can also be configured as a part-wheel segment 34 as seen in FIGS. 1–7. The part-wheel segment 34 also comprises friction-seeking means 29 in the form of spikes 35. In this case, via a distance piece 30 the part-wheel segment 34 will be pivotally connected to the frame 31 via the axis of rotation 28.

When the displacement element 5 consists of a part-wheel segment 34 with said distance piece 30 mounted, the part circle brought about by the connection line between the outermost point on the tip of the friction-seeking means 29 will typically have a curvature radius $K_R$ which is less than the radius measured from the axis of rotation 28 to the centrally positioned spike 35' of the friction-seeking means 29. The activation of the displacement element 5 is effected by means of a first cylinder 7 and a second cylinder 9, where said second cylinder 9 can, for example, be formed as a helical spring. The second cylinder 9 is thus attached directly or indirectly to the displacement element 5, so that when it is compressed or extended, a turning around the axis 28 will take place. The first cylinder 7 can be coupled in two different ways. In the first way, the first cylinder 7 is coupled between the first profile 36 of the frame 31 and the displacement element 5/the distance piece 30, so that when the displacement element 5 is activated, a turning of the displacement element 5 will take place at the same time that a relative movement occurs between the slaughtered animal and the apparatus 1. In the second way, the first cylinder 7 is coupled between the first profile 36 of the frame 31 and the frame's 31 second profile 37, where the first profile 36 is mounted in a fixed manner and the second profile 37 is pivotal around the pivot connection 33, so that use is made of the force from the first cylinder 7 to press the frame 31 and herewith the displacement element 5 into contact with the belly of the slaughtered animal, and the movement of the whole apparatus 1 in the cutting direction $S_R$ results in the displacement element 5 being moved with the slaughtered animal, so that a relative movement takes place between the slaughtered animal and the apparatus 1, and whereby the second cylinder 9 is extended.

In the cases where the displacement element 5 consists of a wheel as seen in FIG. 8*a–c*, where the centre of the wheel is mounted on the axis of rotation 28, which results in an angular positioning of the wheel, the periphery of the wheel corresponds to the connection line between the outermost point on the tip of the friction-seeking means 29, which results in a curvature radius $K_R$. The activation of the displacement element 5 is effected by means of a first cylinder 7, which is coupled between the first profile 36 and the second profile 37 of the frame 31, where the first profile 36 is mounted in a fixed manner and the second profile 37 is pivotally mounted around the pivot connection 33, so that use is made of the force from the first cylinder 7 to press the second profile 37 and herewith the displacement element 5 into contact with the belly of the slaughtered animal, and hereafter apply a greater and greater pressure on the skin the more the wheel is pressed on the skin, and the wheel rotates at a speed adjusted to the relative movement of the slaughtered animal and the apparatus 1. When the penis area has been passed, the pressure is relieved and the wheel is moved back to the start position.

FIG. 8*c* shows the way in which the spikes 29 are oriented, and where their line of engagement is parallel with the cutting direction and/or the symmetrical plane of the slaughtered animal.

The combination between the relative movement of the slaughtered animal in relation to the apparatus 1 and the activation of the displacement element 5 is important in achieving a correct utilisation of the angled axis of rotation 28, and herewith in achieving an adequate displacement of the penis.

The manner in which the apparatus 1 is attached to the first means/the cutting arrangement 2, which in this case consists of an under-knife 3 and an upper-knife 4, appears from FIG. 3. The knife, however, can also be a circular saw.

FIG. 2 shows the apparatus 1 in FIG. 1 seen from the front, where the actual axis of rotation 28 to which the displacement element 5 is attached forms an acute angle of approx. 65–85° to the longitudinal direction $L_R$, and said angle can also be expressed as an obtuse angle of 95–115°. FIG. 4 again shows the actual attachment of the apparatus 1 to the first means 2, which again consists of an under-knife 3 and an upper-knife 4. The knife, however, can also be a circular saw.

FIG. 4 also shows the apparatus 1 in FIG. 3 seen from the front, and where the relationships between the displacement element 5 and the cutting edge of the knife are seen, inasmuch as these lie parallel to one another prior to engagement.

FIG. 5 shows the yoke 32 mounted on the frame 31, i.e. on the second profile 37, and where the yoke 32 has an axis of rotation 28 in which the displacement element 5 is fastened, and forms an angle of approx. 5–25° with the horizontal plane, which stands at right-angles to the cutting direction and/or the symmetrical plane of the slaughtered animal.

FIG. 6 shows a close-up view of a preferred embodiment of the displacement element 5, which thus comprises a part-wheel segment 34 with spikes 35 mounted at uniform intervals on the convex surface, and where the tips of these spikes 35, if they are connected, form a curvature radius $K_R$ which is smaller than the distance from the centrally placed spike 35' to the centre of the axis of rotation 28.

As mentioned, the displacement element can also be configured as a wheel with its centre in the axis of rotation 28. This requires a certain alteration of the apparatus 1 and the first means 2, so that the wheel does not collide with the cylinders which control the movement, the mounting plate 27 and the frame 31 itself.

When the engagement points of the friction-seeking means are connected to an engagement line—identical with $K_R$ when the means are formed as spikes—it is important that this line will lie parallel with the cutting direction and/or the symmetrical plane of the slaughtered animal.

In FIG. 7*a–d* it is seen how the displacement element 5 is activated for contact against the belly when the first means 2 reach the penis area, and where a cutting over of the penis is desired to be avoided. As a result of the inclined axis around which the displacement element 5 rotates, the line of engagement of the displacement element will still lie parallel with the cutting direction $S_R$, but during its rolling contact movement it will assume a greater and greater distance to the first means 2, whereby the skin is thus displaced laterally. During this movement, the displacement element 5 turns towards the cutting direction $S_R$. When the first means 2 have passed the penis, the engagement in the skin is released and the displacement element 5 swings back to the start position and is ready for the next slaughtered animal.

It should further be noted that when use is made of a knife with a cantilever function, the under-knife 3 is movable in relation to the upper-knife 4, so that together the two knives work like a pair of scissors, and where a snap movement of the under-knife 3 towards the upper-knife 4 can be brought about with great power for the cutting over of areas which are difficult to pass, e.g. the breastbone.

The under-knife 3 comprises a recess which the upper-knife 4 passes down into. In cross-section, the under-knife 3 is thus U-shaped. As mentioned, a saw blade can also be used for this construction, whereby another form of counter-stop is used.

It is preferred that the apparatus 1 is mounted directly on the knife, regardless of whether the one or the other form of knife is used, so that the mutual relationship between the cutting direction of the knives and the displacement can be controlled to a higher degree. It could be envisaged, however, that the displacement element 5 itself can be mounted in a slightly different manner, so that it does not directly constitute a movable part in relation to certain parts of the knife.

Moreover, it should be noted that during the cutting process, it is preferred that the cutting direction $S_R$ does not extend in a substantially symmetrical manner, but is slightly inclined and is thus started lowermost to the left of the symmetrical plane of the slaughtered animal, and ends at the top laterally to the right of the symmetrical plane of the slaughtered animal. The system can be used for all kinds of slaughtered animals, however, it is especially suitable for slaughtered pigs.

The breast and belly are opened by the under-knife 3 being fed in a horizontal and vertical movement through the stab wound in the neck of the pig and up internally in the chest. At the same time, the under-knife 3 is moved towards the fixed upper-knife 4. When the under-knife 3 is completely inside the chest, the horizontal and vertical movement is stopped, while the under-knife 3 continues towards the fixed upper-knife 4, whereby the breast bone is cut. Hereafter, the under-knife 3 is opened slightly and the movement continues.

The under-knife 3 is now pressed up between the peritoneum and belly fat, which is cut through by the upper-knife 4 when it slides down over the under-knife 3.

When the tip of the under-knife 3 is just below the foreskin sack, the cylinder 7 is activated and, by means of the first profile 36, the displacement element 5 is fed towards the belly of the pig, and the spikes 35 will gain a grip on the belly at the foreskin sack as it slides down over the under-knife 3. Due to the pivot point of the displacement element 5, which is angled in relation to the movement up, the displacement element 5 will draw the foreskin sack away from the first means 2, whereby it is not cut through.

When the foreskin sack has passed the first means 2, the cylinder 7 returns to its initial position, the first profile 36 moves back and the spring 9 draws the displacement element 5 to its start position.

Few changes and modifications of the apparatus 1 as described in the present invention can circumvent that disclosed in the description, but the invention shall not be considered to be limited hereto.

The invention claimed is:

1. An apparatus (1) for cutting the belly of a slaughtered animal comprising:
   first cutting means (2) for cutting the belly of the slaughtered animal in a cutting direction ($S_R$);
   displacement means located adjacent to the first means for engaging a predetermined area on an outer surface of the belly, at a first laterally displaced distance from the first means and the cutting direction, the displacement means pivotable about an axis of rotation oriented at an obtuse or acute angle relative to the cutting direction;
   suspension means for pivotably supporting the displacement means for movement with the first means along the cutting direction, the displacement means oriented at the obtuse or acute angle and initially being out of contact with the outer surface of the belly;
   means for moving the displacement means into first engaging the predetermined area on the outer surface of the belly and for rotating the displacement means about the angled axis of rotation, in a direction counter to the cutting direction, rotation of the displacement means moving the displacement means in a lateral direction to a second lateral distance further away from the cutting direction than the first laterally spaced distance while simultaneously the suspension means move with the first cutting means which are displaced along the cutting direction such that the displacement means are displaced laterally for laterally moving the engaged outer surface of the animal away as the outer surface adjacent to the engaged outer surface is cut by the first cutting means, the displacement means comprising a projecting piece (30) having friction means (29) disposed at an end thereof for engaging the outer surface of the slaughtered animal, said friction means (29) including at least one spike (35).

2. An apparatus (1) for cutting a belly of a slaughtered animal comprising:
   first cutting means for cutting the belly of the slaughtered animal in a cutting direction ($S_R$);
   displacement means located adjacent to the first means for engaging a predetermined area on an outer surface of the belly, at a first laterally displaced distance from the first means and the cutting direction, the displacement means pivotable about an axis of rotation oriented at an obtuse or acute angle relative to the cutting direction;
   suspension means for pivotably supporting the displacement means for movement with the first means along the cutting direction, the displacement means oriented at the obtuse or acute angle and initially being out of contact with the outer surface of the belly;
   means for moving the displacement means into first engaging the predetermined area on the outer surface of the belly and for rotating the displacement means about the angled axis of rotation, in a direction counter to the cutting direction, rotation of the displacement means moving the displacement means in a lateral direction to a second lateral distance further away from the cutting direction than the first laterally spaced distance while simultaneously the suspension means move with the first cutting means which are displaced along the cutting direction such that the displacement means are displaced laterally for laterally moving the engaged outer surface of the animal away as the outer surface adjacent to the engaged outer surface is cut by the first cutting means, the displacement means comprising a projecting piece (30) having friction means (29) disposed at an end thereof for engaging the outer surface of the slaughtered animal, said friction means (29) including a plurality of spikes (35), each spike including a tip, an imaginary connection line formed by extending across and connecting to tips of each of the spikes having a curvature radius ($K_R$), said curvature radius being smaller than a distance between a tip of a centrally located spike and the axis of rotation of the displacement means.

3. The apparatus according to claim 2 wherein the displacement means comprise a wheel having a radius of a dimension which is equal to a distance from the axis of rotation (28) to the tip of the centrally located spike.

4. The apparatus according to claim 2 wherein the displacement means comprise a part-wheel segment (34) having a radius of a dimension which is equal to a distance from the axis of rotation (28) to the tip of the centrally located spike.

5. An apparatus (1) for cutting a belly of a slaughtered animal comprising:
   first cutting means (2) for cutting the belly of the slaughtered animal in a cutting direction ($S_R$);
   displacement means located adjacent to the first means for engaging a predetermined area on an outer surface of the belly, at a first laterally displaced distance from the first means and the cutting direction, the displacement means pivotable about an axis of rotation oriented at an obtuse or acute angle relative to the cutting direction:
   suspension means for pivotably supporting the displacement means for movement with the first means along the cutting direction, the displacement means oriented at the obtuse or acute angle and initially being out of contact with the outer surface of the belly;
   means for moving the displacement means into first engaging the predetermined area on the outer surface of the belly and for rotating the displacement means about an angled axis of rotation, in a direction counter to the cutting direction, rotation of the displacement means moving the displacement means in a lateral direction to a second lateral distance further away from the cutting direction than the first laterally spaced distance while simultaneously the suspension means move with the first cutting means which are displaced along the cutting direction such that the displacement means are displaced laterally for laterally moving the engaged outer surface of the animal away as the outer surface adjacent to the engaged outer surface is cut by the first cutting means, the suspension means comprising a suspension element (40) comprising a mounting plate (27), said mounting plate (27) supporting a frame (31), said frame (31) having a first arm (36) and a second arm

(37) mounted in a pivotal connection (33), an end of the second arm pivotably supporting the displacement means for rotation about the axis of rotation (28).

6. An apparatus (1) for cutting a belly of a slaughtered animal comprising:
   first cutting means (2) for cutting the belly of the slaughtered animal in a cutting direction ($S_R$);
   displacement means located adjacent to the first means for engaging a predetermined area on an outer surface of the belly, at a first laterally displaced distance from the first means and the cutting direction, the displacement means pivotable about an axis of rotation oriented at an obtuse or acute angle relative to the cutting direction;
   suspension means for pivotably supporting the displacement means for movement with the first means along the cutting direction, the displacement means oriented at an obtuse or acute angle and initially being out of contact with the outer surface of the belly;
   means for moving the displacement means into first engaging the predetermined area on the outer surface of the belly and for rotating the displacement means about the angled axis of rotation, in a direction counter to the cutting direction, rotation of the displacement means moving the displacement means in a lateral direction to a second lateral distance further away from the cutting direction than the first laterally spaced distance while simultaneously the suspension means move with the first cutting means which are displaced along the cutting direction such that the displacement means are displaced laterally for laterally moving the engaged outer surface of the animal away as the outer surface adjacent to the engaged outer surface is cut by the first cutting means, the first cutting means (2) being an upper-knife (4) and an under-knife (3), said under-knife (3) having a recess through which the upper-knife (4) passes.

7. A method for cutting the belly of a slaughtered animal comprising:
   providing an apparatus (1) having first cutting means (2), for cutting the belly of the slaughtered animal in a cutting direction ($S_R$),
   providing displacement means located adjacent to the first means for engaging a predetermined area on an outer surface of the belly, at a first laterally displaced distance from the first means and the cutting direction, the displacement means pivotable about an axis of rotation oriented at an obtuse or acute angle relative to the cutting direction,
   providing suspension means for pivotably supporting the displacement means for movement with the first means along the cutting direction, the displacement means oriented at the obtuse or acute angle, and initially being out of contact with the outer surface of the belly, means for moving the displacement means into first engaging the predetermined outer surface of the belly and for rotating the displacement means about the axis of rotation, in a direction counter to the cutting direction;
   moving the first cutting means into cutting engagement with the slaughtered animal, and moving the first cutting means forwards in a vertical direction for cutting the belly;
   moving the displacement means into contact with an outer surface of the belly of the slaughtered animal at a first lateral distance in an area lying in front of an area where the cutting has taken place; and,
   rotating the displacement means about the angled axis of rotation in the direction counter to the vertical direction while simultaneously moving the first means forward in the vertical direction for moving the displacement means laterally to a second lateral distance further away from the vertical cutting direction ($S_R$), than the first laterally spaced distance, for laterally moving the engaged outer surface of the slaughtered animal away as the outer surface is cut by the firs means.

8. The method according to claim 7 wherein the first means have an under-knife which is moved forwards at a first angle into a position of contact against the belly of the slaughtered animal and under the surface of the belly, and an upper-knife, and further comprising moving the under-knife (3) in a scissor movement towards the upper-knife (4) in an area around a breastbone of the slaughtered animal.

* * * * *

UNITED STATES PATENT AND TRADEMARK OFFICE
CERTIFICATE OF CORRECTION

PATENT NO.       : 7,261,630 B2                                Page 1 of 1
APPLICATION NO.  : 10/433073
DATED            : August 28, 2007
INVENTOR(S)      : Knud Krogh It is certified that error appears in the above-identified patent and that said Letters Patent is hereby corrected as shown below:

On the cover page, under item (30),
"Foreign Application Priority Date"

insert

-- March 9, 2001        (DK)    2001 00458 --

Signed and Sealed this

Second Day of December, 2008

JON W. DUDAS
*Director of the United States Patent and Trademark Office*